United States Patent
Kitao et al.

(10) Patent No.: US 7,198,871 B2
(45) Date of Patent: Apr. 3, 2007

(54) NON-AQUEOUS ELECTROLYTE SECONDARY BATTERY

(75) Inventors: Hideki Kitao, Kobe (JP); Takao Inoue, Kobe (JP); Katsunori Yanagida, Itami (JP); Naoya Nakanishi, Kobe (JP); Atsuhiro Funahashi, Toyonaka (JP); Toshiyuki Nohma, Kobe (JP)

(73) Assignee: Sanyo Electric, Co., Ltd., Moriguchi (JP)

( * ) Notice: Subject to any disclaimer, the term of this patent is extended or adjusted under 35 U.S.C. 154(b) by 393 days.

(21) Appl. No.: 10/604,826

(22) Filed: Aug. 20, 2003

(65) Prior Publication Data
US 2004/0110064 A1  Jun. 10, 2004

(30) Foreign Application Priority Data
Aug. 21, 2002 (JP) ............... 2002-240610
Oct. 10, 2002 (JP) ............... 2002-297739

(51) Int. Cl.
*H01M 10/40* (2006.01)
*H01M 4/58* (2006.01)
*H01M 4/50* (2006.01)
*H01M 4/52* (2006.01)

(52) U.S. Cl. ............... 429/331; 429/188; 429/306; 429/307; 429/309; 429/223; 429/224; 429/231.3; 429/231.5

(58) Field of Classification Search ............... 429/188, 429/303, 324, 326, 209–244, 231.8, 331
See application file for complete search history.

(56) References Cited

U.S. PATENT DOCUMENTS

| | | | |
|---|---|---|---|
| 5,352,548 A | 10/1994 | Fujimoto et al. | 429/197 |
| 5,626,981 A | 5/1997 | Simon et al. | 429/105 |
| 6,007,947 A | 12/1999 | Mayer | |
| 6,156,432 A * | 12/2000 | Mabuchi et al. | 428/408 |
| 6,159,636 A * | 12/2000 | Wang et al. | 429/223 |
| 6,482,550 B1 | 11/2002 | Imachi et al. | |

(Continued)

FOREIGN PATENT DOCUMENTS
EP  0 785 207  7/1997

(Continued)

OTHER PUBLICATIONS
Office Action dated Aug. 8, 2006 of JP2002-297739.

(Continued)

*Primary Examiner*—Patrick Joseph Ryan
*Assistant Examiner*—Alix Echelmeyer
(74) *Attorney, Agent, or Firm*—Westerman, Hattori, Daniels & Adrian, LLP

(57) ABSTRACT

In a non-aqueous electrolyte secondary battery provided with a positive electrode, a negative electrode, and a non-aqueous electrolyte solution, a positive electrode active material is a mixture of lithium-manganese composite oxide and at least one of lithium-nickel composite oxide represented by a general formula $LiNi_aM1_{1-a}O_2$ and lithium-cobalt composite oxide represented by the general formula $LiCo_bM2_{1-b}O_2$, and said non-aqueous electrolyte solution contains at least a saturated cyclic carbonic acid ester and an unsaturated cyclic carbonic acid ester having double bond of carbon where content by amount of said unsaturated cyclic carbonic acid ester having double bond of carbon is in a range of $1.0 \times 10^{-8}$ to $2.4 \times 10^{-4}$ g per positive electrode capacity 1 mAh.

8 Claims, 2 Drawing Sheets

U.S. PATENT DOCUMENTS

| | | | |
|---|---|---|---|
| 6,767,671 B2 * | 7/2004 | Itagaki et al. | 429/328 |
| 6,884,546 B1 * | 4/2005 | Fujita et al. | 429/231.9 |
| 2004/0072072 A1 * | 4/2004 | Suzuki et al. | 429/231.1 |

FOREIGN PATENT DOCUMENTS

| | | |
|---|---|---|
| EP | 0 989 622 | 3/2000 |
| EP | 1 180 809 | 2/2002 |
| EP | 1 193 782 | 4/2002 |
| JP | 11-283667 | 10/1999 |
| JP | P3024636 | 1/2000 |
| JP | 2000-77071 | 3/2000 |
| JP | 2000-340232 | 12/2000 |
| JP | 2001-143705 | 5/2001 |
| JP | 2002-175810 | 6/2002 |

OTHER PUBLICATIONS

European Search Report dated Nov. 9, 2006 of EP 03 01 8837.

* cited by examiner

NON-AQUEOUS ELECTROLYTE SECONDARY BATTERY

FIELD OF THE INVENTION

The present invention relates generally to a non-aqueous electrolyte secondary battery provided with a positive electrode capable of absorbing and desorbing lithium, a negative electrode capable of absorbing and desorbing lithium, and a non-aqueous electrolyte solution, and particularly, to a non-aqueous electrolyte secondary battery having a high capacity, excellent thermal stability and storage characteristics under high temperature conditions, and excellent high rate discharge characteristics.

DESCRIPTION OF THE RELATED ART

Recently, as one type of advanced secondary batteries featuring high power and high energy density, non-aqueous electrolyte secondary batteries of high electromotive force, using a non-aqueous electrolyte solution as its electrolyte, and featuring light weight, high capacity, excellent charge/discharge cycle characteristics, which are derived from oxidation and reduction of lithium have come into practical use.

In such non-aqueous electrolyte secondary batteries, lithium-transition metal composite oxides including lithium-cobalt composite oxide such as $LiCoO_2$, lithium-nickel composite oxide such as $LiNiO_2$, and lithium-manganese composite oxide such as $LiMn_2O_4$ are generally used as a positive electrode active material in the positive electrode.

When the lithium-manganese composite oxide such as $LiMn_2O_4$ is used, thermal stability is higher compared with the cases where the lithium-cobalt composite oxide such as $LiCoO_2$ or the lithium-nickel composite oxide such as $LiNiO_2$ is used, however, there have remained problems that the capacity is decreased, hence the non-aqueous electrolyte secondary batteries having high capacity is not attained, and storage characteristics and charge/discharge cycle characteristics are degraded.

Therefore, in recent years, Japanese Patent No. 3024636 has shown the use of the mixture of the lithium-manganese composite oxide such as $LiMn_2O_4$ and the lithium-nickel composite oxide such as $LiNiO_2$, to increase the capacity of the non-aqueous electrolyte secondary battery, and to improve the storage characteristics and the charge/discharge cycle characteristics under high temperature conditions.

Unfortunately, however, the use of the mixture of the lithium-manganese composite oxide such as $LiMn_2O_4$ and the lithium-nickel composite oxide such as $LiNiO_2$ has not fully modified the storage characteristics under high temperature conditions.

SUMMARY OF THE INVENTION

An object of the present invention is to solve the above-mentioned various problems in a non-aqueous electrolyte secondary battery provided with a positive electrode capable of absorbing and desorbing lithium, a negative electrode capable of absorbing and desorbing lithium, and a non-aqueous electrolyte solution.

More specifically, an object of the present invention is to provide a non-aqueous electrolyte secondary battery having a high capacity, excellent thermal stability and storage characteristics under high temperature conditions, and excellent high rate discharge characteristics.

According to the present invention, in the non-aqueous electrolyte secondary battery provided with the positive electrode capable of absorbing and desorbing lithium, the negative electrode capable of absorbing and desorbing lithium, and the non-aqueous electrolyte solution, as a positive electrode active material forming the positive electrode, a mixture of lithium-manganese composite oxide and at least one of lithium-nickel composite oxide represented by a general formula $LiNi_aM1_{1-a}O_2$ (wherein M1 denotes at least one element selected from B, Mg, Al, Ti, Mn, V, Fe, Co, Cu, Zn, Ga, Y, Zr, Nb, Mo, and In, and a relationship $0<a \leq 1$ is satisfied), and lithium-cobalt composite oxide represented by the general formula $LiCo_bM2_{1-b}O_2$ (wherein M2 denotes at least one element selected from B, Mg, Al, Ti, Mn, V, Fe, Ni, Cu, Zn, Ga, Y, Zr, Nb, Mo, and In, and the relationship $0<b \leq 1$ is satisfied) is used, and the non-aqueous electrolyte solution contains at least a saturated cyclic carbonic acid ester and an unsaturated cyclic carbonic acid ester having double bond of carbon where content by amount of the unsaturated cyclic carbonic acid ester having double bond of carbon is in a range of $1.0 \times 10^{-8}$ to $2.4 \times 10^{-4}$ g per positive electrode capacity 1 mAh.

As in the non-aqueous electrolyte secondary battery according to the present invention, when the mixture of the lithium-manganese composite oxide and at least one of the lithium-nickel composite oxide and the lithium-cobalt composite oxide is used as the positive electrode active material, capacity of the non-aqueous electrolyte secondary battery is increased, voltage region by charge/discharge is lowered, and the positive electrode active material is prevented from reaction with the non-aqueous electrolyte solution under high temperature conditions, thus the storage characteristics and the charge/discharge cycle characteristics are improved, compared with the case where only the lithium-manganese composite oxide is used. Especially, when the lithium-manganese composite oxide whose crystal structure is a spinel structure is used as the above-mentioned lithium-manganese composite oxide, more excellent effects can be obtained.

In addition, when the non-aqueous electrolyte solution containing at least the saturated cyclic carbonic acid ester and the unsaturated cyclic carbonic acid ester having double bond of carbon is used, the positive electrode active material is further prevented from the reaction with the non-aqueous electrolyte solution and an appropriate film is formed for the effect of the unsaturated cyclic carbonic acid ester having double bond of carbon, thus the reaction between the manganese which elutes from the positive electrode and the negative electrode is prevented, as a result, the storage characteristics under high temperature conditions is further improved.

In the non-aqueous electrolyte solution containing at least the saturated cyclic carbonic acid ester and the unsaturated cyclic carbonic acid ester having double bond of carbon, the content by amount of the unsaturated cyclic carbonic acid ester having double bond of carbon is set in the range of $1.0 \times 10^{-8}$ to $2.4 \times 10^{-4}$ g per positive electrode capacity 1 mAh because when the content by amount of the unsaturated cyclic carbonic acid ester is less than $1.0 \times 10^{-8}$ g, the positive electrode active material is not sufficiently prevented from the reaction with the non-aqueous electrolyte solution, and the manganese which elutes from the positive electrode is not sufficiently prevented from the reaction with the negative electrode, on the other hand, when the content by amount of the unsaturated cyclic carbonic acid ester is more than $2.4 \times 10^{-4}$ g, the unsaturated cyclic carbonic acid ester having double bond of carbon remains in the non-aqueous electrolyte solution in excess, ion conductivity in the non-aqueous electrolyte solution is decreased, thus the high rate discharge characteristics is degraded, as a result, discharge capacity at high current is decreased.

In order to further improve the high rate discharge characteristics and the storage characteristics of the non-aqueous electrolyte secondary battery, the lithium-nickel composite oxide and the lithium-cobalt composite oxide as the positive electrode active material having BET specific surface area in the range of 0.2 to 10 $m^2/g$, and an average particle diameter in the range of 1 to 15 μm is preferably used.

Further, in order to widen discharge voltage region and improve the high rate discharge characteristics of the non-aqueous electrolyte secondary battery, the lithium-nickel composite oxide represented by the general formula $LiNi_cMn_dM3_{1-d}O_2$, (wherein M3 denotes at least one element selected from B, Mg, Al, Ti, V, Fe, Co, Cu, Zn, Ga, Y, Zr, Nb, Mo, and In, and the relationships $0<c\leq1$, $0.1<d$ are satisfied) is preferably used as the lithium-nickel composite oxide in the positive electrode active material. Further, in the general formula, M3 is preferably at least one element selected from Co, Al, Mg, and Cr, and the general formula $LiNi_cMn_dCo_{1-d}O_2$, wherein M3 denotes Co is more preferably used. In addition, in order to improve the thermal stability of the of the non-aqueous electrolyte secondary battery, the general formula $LiNi_cMn_dCo_{1-d}O_2$, wherein the relationships $0<c<0.5$, $0.1<d<0.6$ are satisfied is preferably used.

In addition, in order to further improve the storage characteristics and charge/discharge capacity of the non-aqueous electrolyte secondary battery, the lithium-manganese composite oxide in the positive electrode active material represented by the general formula $Li_{1+e}Mn_{2-f}M4_fO_4$, (wherein M4 denotes at least one element selected from the group consisting of B, Mg, Al, Ti, Mn, V, Fe, Co, Ni, Cu, Zn, Ga, Y, Zr, Nb, Mo, In, and Cr, and the relationships $0\leq e\leq0.5$, $0\leq f\leq1$ are satisfied), and having an average particle diameter in the range of 5 to 15 μm is preferably used, and more preferably, M4 denoting Al and Mg.

In addition, in order to improve the thermal stability and increase the charge/discharge capacity of the non-aqueous electrolyte secondary battery, mixture ratio of at least one of the lithium-nickel composite oxide and the lithium-cobalt composite oxide, and the lithium-manganese composite oxide is preferably set in the range of 20:80 to 80:20 by weight.

Examples of the unsaturated cyclic carbonic acid ester having double bond of carbon usable for the non-aqueous electrolyte solution in the non-aqueous electrolyte secondary battery include vinylene carbonate, 4,5-dimethyl vinylene carbonate, 4,5-diethyl vinylene carbonate, 4,5-dipropyl vinylene carbonate, 4-ethyl-5-methyl vinylene carbonate, 4-ethyl-5-propyl vinylene carbonate, 4-methyl-5-propyl vinylene carbonate, and in order to further improve the storage characteristics of the non-aqueous electrolyte secondary battery, vinylene carbonate is preferably used.

Examples of the saturated cyclic carbonic acid ester usable for the non-aqueous electrolyte solution include ethylene carbonate, propylene carbonate, butylene carbonate, and these solvents may be used alone or in combination of two or more, especially, ethylene carbonate, propylene carbonate, and a mixed solvent of ethylene carbonate and propylene carbonate are preferably used.

When a chain carbonic acid ester is contained in the non-aqueous electrolyte solution in addition to the unsaturated cyclic carbonic acid ester having double bond of carbon and the saturated cyclic carbonic acid ester, viscosity of the non-aqueous electrolyte solution is lowered, thus a percentage of capacity retention at normal temperature and at high temperature, and low temperature discharge characteristics are improved. Examples of the chain carbonic acid ester include dimethyl carbonate, ethyl methyl carbonate, diethyl carbonate, methyl propyl carbonate, ethyl propyl carbonate, and methyl isopropyl carbonate, and these solvents may be used alone or in combination of two or more.

The non-aqueous electrolyte solution may contain ester group including methyl acetate, ethyl acetate, propyl acetate, methyl propionate, ethyl propionate, γ-butyrolactone, ether group including tetrahydrofuran, 2-methyl tetrahydrofuran, 1,4-dioxane, 1,2-dimethoxyethane, 1,2-diethoxyethane, nitrile group including acetonitrile, and amide group including dimethylformamide in addition to the unsaturated cyclic carbonic acid ester having double bond of carbon, the saturated cyclic carbonic acid ester, and the chain carbonic acid ester.

In the non-aqueous electrolyte solution, known electrolytes for use in the non-aqueous electrolyte secondary batteries may be used as the electrolyte. Examples of the usable electrolyte include $LiPF_6$, $LiAsF_6$, $LiBF_4$, $LiCF_3SO_3$, $LiN(C_lF_{2l+1}SO_2)(C_mF_{2m+1}SO_2)$ (wherein l and m denote an integer not less than 1), $LiC(C_pF_{2p+1}SO_2)(C_qF_{2q+1}SO_2)(C_rF_{2r+1}SO_2)$ (wherein p, and r denote an integer not less than 1), and these electrolytes may be used alone or in combination of two or more. Density of the electrolyte in the non-aqueous electrolyte solution is generally set in the range of 0.1 to 1.5 mol/l, and is preferably set in the range of 0.5 to 1.5 mol/l.

The non-aqueous electrolyte secondary battery according to the present invention may use known negative electrode active materials in the negative electrode. Examples of the usable negative electrode active material include metal lithium, lithium alloy, and carbon materials capable of absorbing and desorbing lithium ions, including graphite, coke, sintered organic substances.

In order to attain sufficient battery capacity, graphite is preferably used as the negative electrode active material. When graphite coated with low crystalline carbon where whole or a part of a surface of first graphite material as a substrate is coated with second carbon material which is lower in crystallinity compared with the first graphite material is used as the negative electrode active material, reception of lithium ions is increased for the effect of the low crystalline carbon on the surface, and the high rate discharge characteristics of the non-aqueous electrolyte secondary battery is improved. In order to coat the surface of first graphite material which is the substrate with the second carbon material having low crystallinity, dry process, wet process, liquid-phase process, vapor-phase process, partial vapor-phase process, and so on may be employed.

In addition, the aforesaid graphite coated with low crystalline carbon where whole or a part of the surface of the first graphite material as the substrate is coated with the second carbon material which is lower in crystallinity preferably has an intensity ratio (IA/IB) which is an intensity IA of 1350/cm based on an intensity IB of 1580/cm, as measured by Raman spectroscopy, in a range of 0.2 to 0.3. A peak in 1580/cm originates in a laminate having hexagonal symmetry which is similar to graphite structure, while the peak in 1350/cm originates in low crystalline structure in which the crystal structure of carbon is disordered. The higher value of IA/IB is, the larger the proportion of the low crystalline carbon on the surface is. When the value of IA/IB is less than 0.2, the proportion of the low crystalline carbon on the surface of graphite is lowered, accordingly, receptibility of lithium ions is not fully improved, while when the value of IA/IB is more than 0.3, the amount of the low crystalline carbon is large and the proportion of graphite is lowered, accordingly the battery capacity is decreased.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
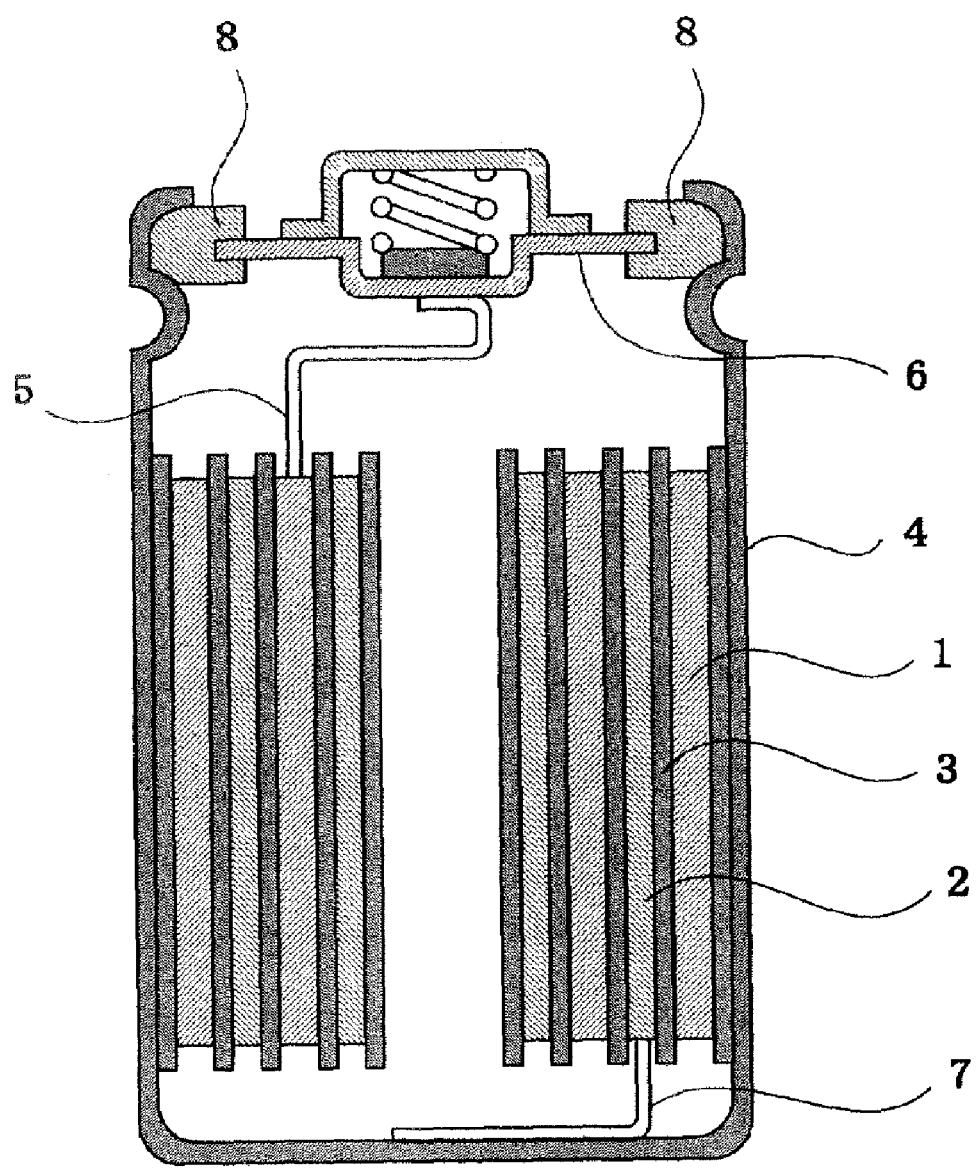
FIG. 1 is a schematic sectional view of a non-aqueous electrolyte secondary battery according to Examples and Comparative Examples of the present invention.

The following examples specifically illustrate non-aqueous electrolyte secondary batteries according to the present invention. Further, comparative examples will be taken to make it clear that each non-aqueous electrolyte secondary battery according to the examples has a high capacity, excellent storage characteristics under high temperature conditions, and excellent high rate discharge characteristics. It should be appreciated that the non-aqueous electrolyte secondary batteries according to the present invention are not particularly limited to those in the following examples, and various changes and modifications may be made in the invention without departing from the spirit and scope thereof.

EXAMPLE 1

In example 1, there were used a positive electrode, a negative electrode, and a non-aqueous electrolyte solution prepared in the following manners so as to fabricate a cylindrical non-aqueous electrolyte secondary battery having a rated capacity of 1.5 Ah.

Preparation of Positive Electrode

In the preparation of a positive electrode, a lithium-nickel-cobalt-manganese composite oxide represented by a general formula $LiNi_{0.4}Co_{0.3}Mn_{0.3}O_2$ and a lithium-manganese composite oxide having a spinel structure represented by the general formula $Li_{1.15}Mn_{1.85}O_4$ were mixed in a weight ratio of 1:1 to obtain a positive electrode active material.

The positive electrode active material, carbon as a conductive agent, and polyvinylidene fluoride as a binding agent were mixed in a weight ratio of 90:5:5. N-methyl-2-pyrolidone was added to a mixture obtained to adjust slurry. Next, the slurry was applied to both sides of an aluminum foil having a thickness of 20 μm by means of doctor blade coating method. The slurry on the aluminum foil was then subject to vacuum drying to obtain a positive electrode.

Preparation of Negative Electrode

In the preparation of a negative electrode, graphite powder was used as a negative electrode active material. The graphite powder and polyvinylidene fluoride as a binding agent were mixed in a weight ratio of 95:5. N-methyl-2-pyrolidone was added to a mixture obtained to adjust slurry. Next, the slurry was applied to both sides of a copper foil having a thickness of 20 μm by means of doctor blade coating method. The slurry on the copper foil was then subject to vacuum drying to obtain a negative electrode. The graphite powder used as the negative electrode active material had an intensity ratio (IA/IB) which was an intensity IA of 1350/cm based on an intensity IB of 1580/cm, as measured by argon laser Raman, of 0.16.

Preparation of Non-aqueous Electrolyte Solution

In the preparation of a non-aqueous electrolyte solution, ethylene carbonate (EC) which is a saturated cyclic carbonic acid ester and diethyl carbonate (DEC) which is a chain carbonic acid ester were mixed in a volume ratio of 3:7 to prepare a mixed solvent, in which $LiPF_6$ was dissolved in a concentration of 1 mol/l, and in which vinylene carbonate (VC) which is an unsaturated cyclic carbonic acid ester having double bond of carbon was further added so that content by amount thereof be $1.3 \times 10^{-4}$ g per positive electrode capacity 1 mAh to obtain a non-aqueous electrolyte solution.

Fabrication of Battery

In the fabrication of a battery, as shown in FIG. 1, a separator 3 formed of a lithium-ion-permeable porous polypropylene film was interposed between the positive electrode 1 and the negative electrode 2 prepared in the above-mentioned manners, and they were contained in a battery can 4 upon being spirally wound after which the non-aqueous electrolyte solution prepared in the above-mentioned manner was poured in the battery can 4 and the battery can 4 was sealed, and the positive electrode 1 was connected to a positive-electrode cover 6 through a positive-electrode lead 5 and the negative electrode 2 was connected to the battery can 4 through a negative-electrode lead 7, to electrically separate the battery can 4 and the positive electrode cover 6 from each other by an insulating packing 8.

COMPARATIVE EXAMPLE 1

In Comparative Example 1, in the preparation of the non-aqueous electrolyte solution of Example 1, vinylene carbonate (VC) which is the unsaturated cyclic carbonic acid ester having double bond of carbon was not added. Except for the above, the same procedure as that in the Example 1 was taken to fabricate a non-aqueous electrolyte secondary battery of Comparative Example 1.

COMPARATIVE EXAMPLE 2

In Comparative Example 2, in the preparation of the positive electrode of Example 1, only the lithium-manganese composite oxide having the spinel structure represented by the general formula $Li_{1.15}Mn_{1.85}O_4$ was used as the positive electrode active material, and lithium-nickel-cobalt-manganese composite oxide represented by the general formula $LiNi_{0.4}Co_{0.3}Mn_{0.3}O_2$ was not added.

Except for the above, the same procedure as that in the Example 1 was taken to fabricate a non-aqueous electrolyte secondary battery of Comparative Example 2.

COMPARATIVE EXAMPLE 3

In Comparative Example 3, in the preparation of the positive electrode of Example 1, only the lithium-manganese composite oxide having the spinel structure represented by the general formula $Li_{1.15}Mn_{1.85}O_4$ was used as the positive electrode active material, and lithium-nickel-cobalt-manganese composite oxide represented by the general formula $LiNi_{0.4}Co_{0.3}Mn_{0.3}O_2$ was not added in the same manner as the Comparative Example 2. In addition, in the preparation of the non-aqueous electrolyte solution, vinylene carbonate (VC) which is the unsaturated cyclic carbonic acid ester having double bond of carbon was not added in the same manner as the Comparative Example 1.

Except for the above, the same procedure as that in the Example 1 was taken to fabricate a non-aqueous electrolyte secondary battery of Comparative Example 3.

Each of the non-aqueous electrolyte secondary batteries of Example 1 and Comparative Examples 1 to 3 thus fabricated was charged at a charging current of 500 mA to a charge cut-off voltage of 4.2 V, and then discharged at a discharging current of 500 mA to a discharge cut-off voltage of 3.0 V under the room temperature of 25° C. The above-mentioned charging and discharging was considered as one cycle. 10 cycles of the charging and discharging were performed, so as to measure discharge capacity Y1 (mAh) at the 10th cycle. The results were shown in the following Table 1.

Each of the non-aqueous electrolyte secondary batteries after 10 cycles of the charging and discharging was charged at the charging current of 500 mA to the charge cut-off voltage of 4.2 V under the room temperature of 25° C., was stored in a homeothermal container in which the temperature was 45 for 30 days, and was discharged at the discharging current of 500 mA to the discharge cut-off voltage of 3.0 V under the room temperature of 25° C. again so as to measure the discharge capacity Y2 (mAh) after storage of each of the non-aqueous electrolyte secondary batteries. A percentage of capacity retention (%) in each of the non-aqueous electrolyte secondary batteries was found by way of the following formula. The results were shown in the following Table 1.

Percentage of capacity retention (%)=(Y2/Y1)×100

The negative electrodes of each of the non-aqueous electrolyte secondary batteries were picked out to measure the amount of Mn deposited on the negative electrodes, so as to find weight ratio (wt %) of Mn based on the graphite as the negative electrode active material. The results were shown in the following Table 1.

positive electrode active material prepared only by the lithium-manganese composite oxide having the spinel structure.

Besides, the non-aqueous electrolyte secondary battery of Example 1 using the positive electrode active material which was prepared by mixing the lithium-nickel-cobalt-manganese composite oxide and the lithium-manganese composite oxide having the spinel structure, and using the non-aqueous electrolyte solution containing ethylene carbonate, diethyl carbonate, and vinylene carbonate presented an improved percentage of capacity retention and storage characteristics and less amount of Mn deposited on the negative electrode compared with the non-aqueous electrolyte secondary batteries of Comparative Examples 1 to 3. The amount of Mn in the non-aqueous electrolyte solutions of each of the non-aqueous electrolyte secondary batteries was less than detectable limit. The Mn which eluted from the positive electrode was expectedly deposited on the negative electrode.

EXAMPLE 2 AND COMPARATIVE EXAMPLES 4 AND 5

In Example 2 and Comparative Examples 4 and 5, in the preparation of the non-aqueous electrolyte solution of Example 1, only the amount of the vinylene carbonate (VC) added to the non-aqueous electrolyte solution was varied as shown in the following Table 2. Specifically, the amount was respectively changed to 2.4 Ω $10^{-4}$ g per positive electrode capacity 1 mAh in Example 2, $4.0 \times 10^{-4}$ g per positive electrode capacity 1 mAh in Comparative Example 4, and $7.0 \times 10^{-4}$ g per positive electrode capacity 1 mAh in Comparative Example 5. Except for the above, the same procedure as that in the Example 1 was taken to fabricate non-aqueous electrolyte secondary batteries of Example 2 and Comparative Examples 4 and 5.

Each of the non-aqueous electrolyte secondary batteries of Example 2 and Comparative Examples 4 and 5 and aforesaid Example 1 and Comparative Example 1 was charged at the charging current of 500 mA to the charge cut-off voltage of 4.2 V, and then discharged at the discharging current of 500 mA to the discharge cut-off voltage of 3.0 V under the room temperature of 25° C. The above-men-

TABLE 1

| | non-aqueous electrolyte solution | positive electrode active material | Y1 (mAh) | percentage of capacity retention (%) | amount of Mn (wt %) |
|---|---|---|---|---|---|
| Example 1 | EC + DEC + VC | $LiNi_{0.4}Co_{0.3}Mn_{0.3}O_2$ + $Li_{1.15}Mn_{1.85}O_4$ | 160 | 95 | $4.0 \times 10^{-3}$ |
| Comparative Example 1 | EC + DEC | $LiNi_{0.4}Co_{0.3}Mn_{0.3}O_2$ + $Li_{1.15}Mn_{1.85}O_4$ | 160 | 80 | $6.0 \times 10^{-2}$ |
| Comparative Example 2 | EC + DEC + VC | $Li_{1.15}Mn_{1.85}O_4$ | 105 | 80 | 0.9 |
| Comparative Example 3 | EC + DEC | $Li_{1.15}Mn_{1.85}O_4$ | 105 | 70 | 1.5 |

As apparent from the results, the non-aqueous electrolyte secondary batteries of Example 1 and Comparative Example 1 using the positive electrode active material which was prepared by mixing the lithium-nickel-cobalt-manganese composite oxide and the lithium-manganese composite oxide having a spinel structure presented a larger discharge capacity compared with the non-aqueous electrolyte secondary batteries of Comparative Examples 2 and 3 using the tioned charging and discharging was considered as one cycle. 10 cycles of the charging and discharging were performed. Then each of the batteries was charged at the charging current of 500 mA to the charge cut-off voltage of 4.2 V, and then discharged at the discharging current of 300 mA to the discharge cut-off voltage of 3.0 V so as to measure the discharge capacity X1 (mAh) at 300 mA of each of the non-aqueous electrolyte secondary batteries.

Figure 2:
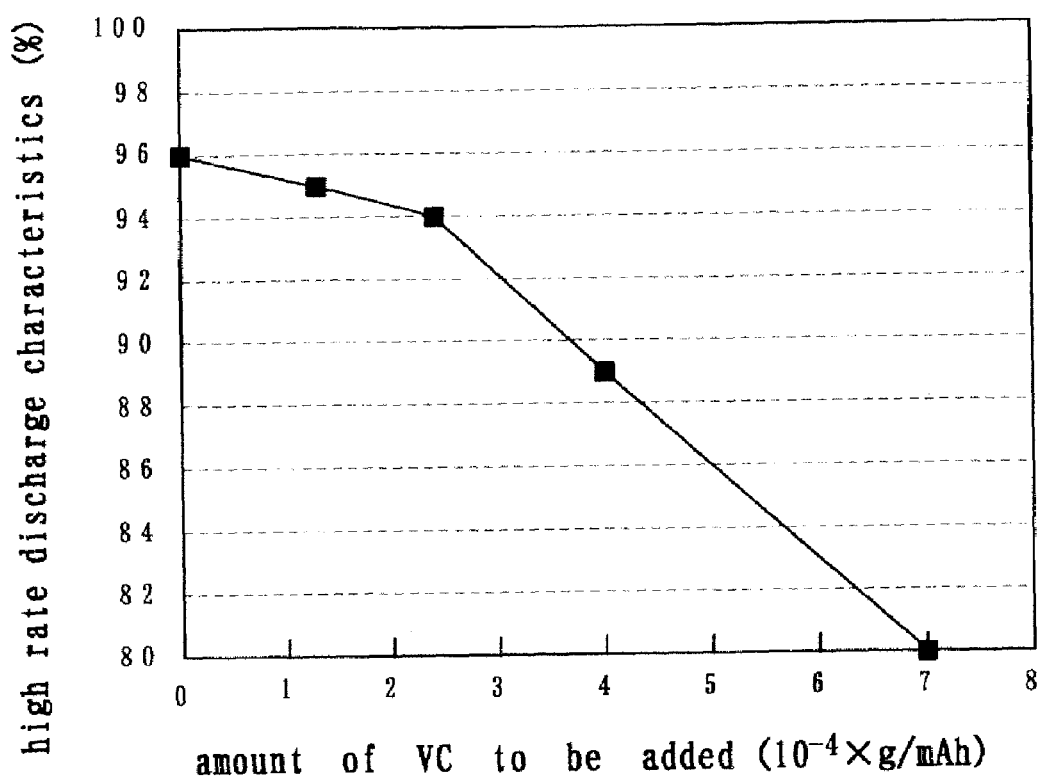
FIG. 2 is a graphical representation of relationship between amount of vinylene carbonate (VC) added to non-aqueous electrolyte solution per positive electrode capacity 1 mAh and high rate discharge characteristics (%) of the non-aqueous electrolyte secondary batteries of Examples 1 and 2 and of Comparative Examples 1, 4, and 5.

Each of the non-aqueous electrolyte secondary batteries was charged at the charging current of 500 mA to the charge cut-off voltage of 4.2 V and was discharged at a high discharging current of 4500 mA to the discharge cut-off voltage of 3.0 V under the room temperature of 25° C. so as to measure the discharge capacity X2 (mAh) at 4500 mA of each of the non-aqueous electrolyte secondary batteries. High rate discharge characteristics (%) of each of the non-aqueous electrolyte secondary batteries was found by way of the following formula. The results were shown in the following FIG. 2.

High rate discharge characteristics (%)=(X2/X1)×100

As apparent from the results, the non-aqueous electrolyte secondary batteries of Example 1 and 2 in which the amount of vinylene carbonate (VC) added to the non-aqueous electrolyte solution was in the range of $1.1 \times 10^{-8}$ g to $2.4 \times 10^{-4}$ g per positive electrode capacity 1 mAh presented a remarkably improved high rate discharge characteristics compared with the non-aqueous electrolyte secondary batteries of Comparative Examples 4 and 5 in which the amount of vinylene carbonate (VC) to be added was more than the above-mentioned range.

EXAMPLE 3

In Example 3, in the preparation of the negative electrode of Example 1, graphite coated with low crystalline carbon where surface of graphite powder is coated with low crystalline carbon by contact between the graphite powder and hydrocarbon under a heat condition was used as the negative electrode active material. The graphite coated with low crystalline carbon where surface of graphite powder is coated with low crystalline carbon had the intensity ratio (IA/IB) which was the intensity IA of 1350/cm based on the intensity IB of 1580/cm, as measured by argon laser Raman, of 0.22.

Except that the negative electrode thus prepared was used, the same procedure as that in the Example 1 was taken to fabricate a non-aqueous electrolyte secondary battery of Example 3.

The percentage of capacity retention (%) and the high rate discharge characteristics (%) of the non-aqueous electrolyte secondary battery of Example 3 was found in the same manner as that in the Example 1. The results were shown in the following Table 2 along with those of Example 1.

TABLE 2

|  | IA/IB value of negative electrode active material | percentage of capacity retention (%) | high rate discharge characteristics (%) |
|---|---|---|---|
| Example 3 | 0.22 | 95 | 96.5 |
| Example 1 | 0.16 | 95 | 95.0 |

As apparent from the results, the non-aqueous electrolyte secondary batteries of Example 3 using the graphite powder coated with low crystalline carbon, where surface of graphite powder is coated with low crystalline carbon as the negative electrode active material presented the high percentage of capacity retention (%) as the non-aqueous electrolyte secondary batteries of Example 1 using the graphite powder whose surface was not coated with low crystalline carbon as the negative electrode active material, and presented more improved high rate discharge characteristics compared with the non-aqueous electrolyte secondary battery of Example 1.

Although the present invention has been fully described by way of examples, it is to be noted that various changes and modification will be apparent to those skilled in the art. Therefore, unless otherwise such changes and modifications depart from the scope of the present invention, they should be constructed as being included therein.

The invention claimed is:

1. A non-aqueous electrolyte secondary battery provided with a positive electrode capable of absorbing and desorbing lithium, a negative electrode capable of absorbing and desorbing lithium, and a non-aqueous electrolyte solution, wherein a positive electrode active material in said positive electrode is a mixture of lithium-manganese composite oxide and lithium-nickel composite oxide represented by the general formula $LiNi_cMn_dCo_{1-c-d}O_2$ (wherein the relationships 0<c<0.5, 0.1<d<0.6 are satisfied), and said non-aqueous electrolyte solution contains at least a saturated cyclic carbonic acid ester and an unsaturated cyclic carbonic acid ester having double bond of carbon where content by amount of said unsaturated cyclic carbonic acid ester having double bond of carbon is in a range of $1.0 \times 10^{-8}$ to $2.4 \times 10^{-4}$ g per positive electrode capacity 1 mAh.

2. The non-aqueous electrolyte secondary battery according to claim 1, wherein said lithium-manganese composite oxide has a spinel-type crystal structure.

3. The non-aqueous electrolyte secondary battery according to claim 2, wherein said lithium-manganese composite oxide is represented by the general formula $Li_{1+e}Mn_{2-f}M4_fO_4$ (wherein M4 denotes at least one element selected from B, Mg, Al, Ti, Mn, V, Fe, Co, Ni, Cu, Zn, Ga, Y, Zr, Nb, Mo, In, and Cr, and the relationships $0 \leq e \leq 0.5$, and $0 \leq f \leq 1$ are satisfied).

4. The non-aqueous electrolyte secondary battery according to claim 1, wherein said unsaturated cyclic carbonic acid ester having double bond of carbon is vinylene carbonate.

5. The non-aqueous electrolyte secondary battery according to claim 1, wherein said non-aqueous electrolyte solution contains a chain carbonic acid ester in addition to the saturated cyclic carbonic acid ester and the unsaturated cyclic carbonic acid ester.

6. The non-aqueous electrolyte secondary battery according to claim 1, wherein negative electrode active material in said negative electrode is graphite.

7. The non-aqueous electrolyte secondary battery according to claim 1, wherein the negative electrode active material in said negative electrode is graphite coated with low crystalline carbon in which whole or a part of a surface of first graphite material as a substrate is coated with second carbon material which is lower in crystallinity compared with the first graphite material.

8. The non-aqueous electrolyte secondary battery according to claim 7, wherein said graphite coated with low crystalline carbon has an intensity ratio (IA/IB) which is an intensity IA of 1350/cm based on an intensity IB of 1580/cm, as measured by argon laser Raman, in a range of 0.2 to 0.3.

* * * * *